June 30, 1970 — A. CARLSEN ET AL — 3,517,716
METHOD FOR COMMINUTING AND DRYING COOKED FOOD PRODUCTS
Original Filed May 11, 1962 — 3 Sheets-Sheet 1

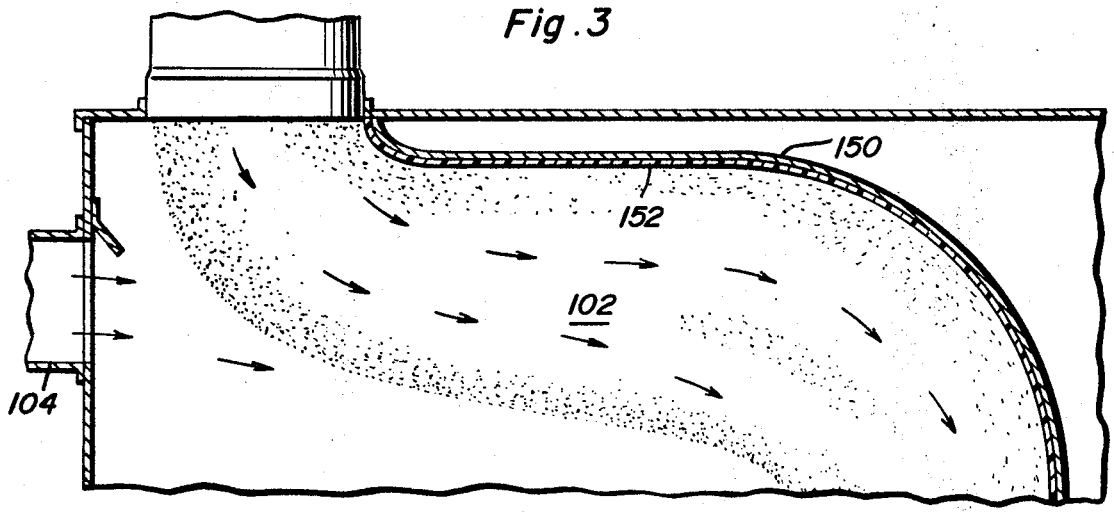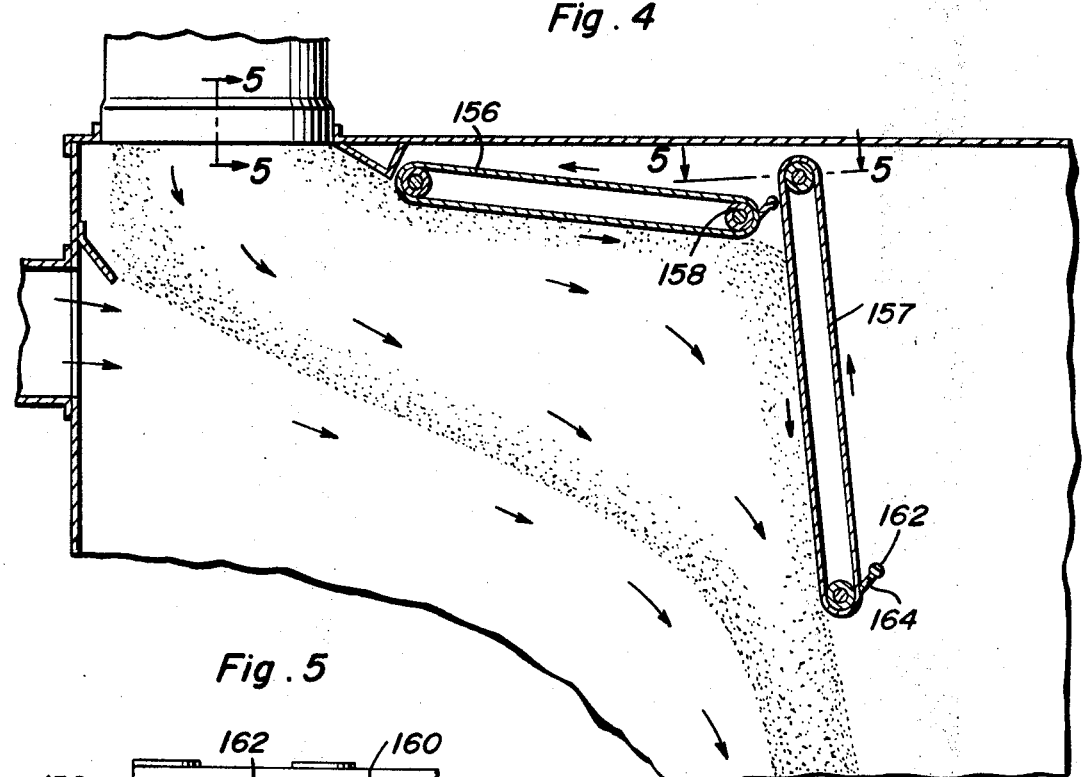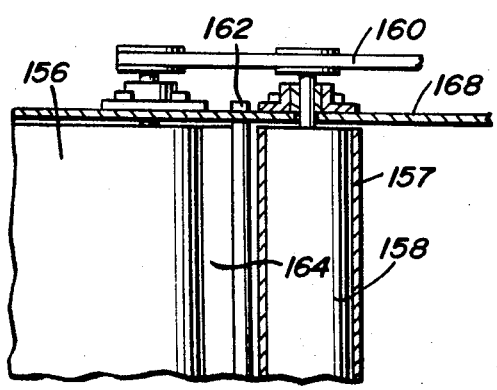

Albert Carlsen
Armstead J. Evans
INVENTORS

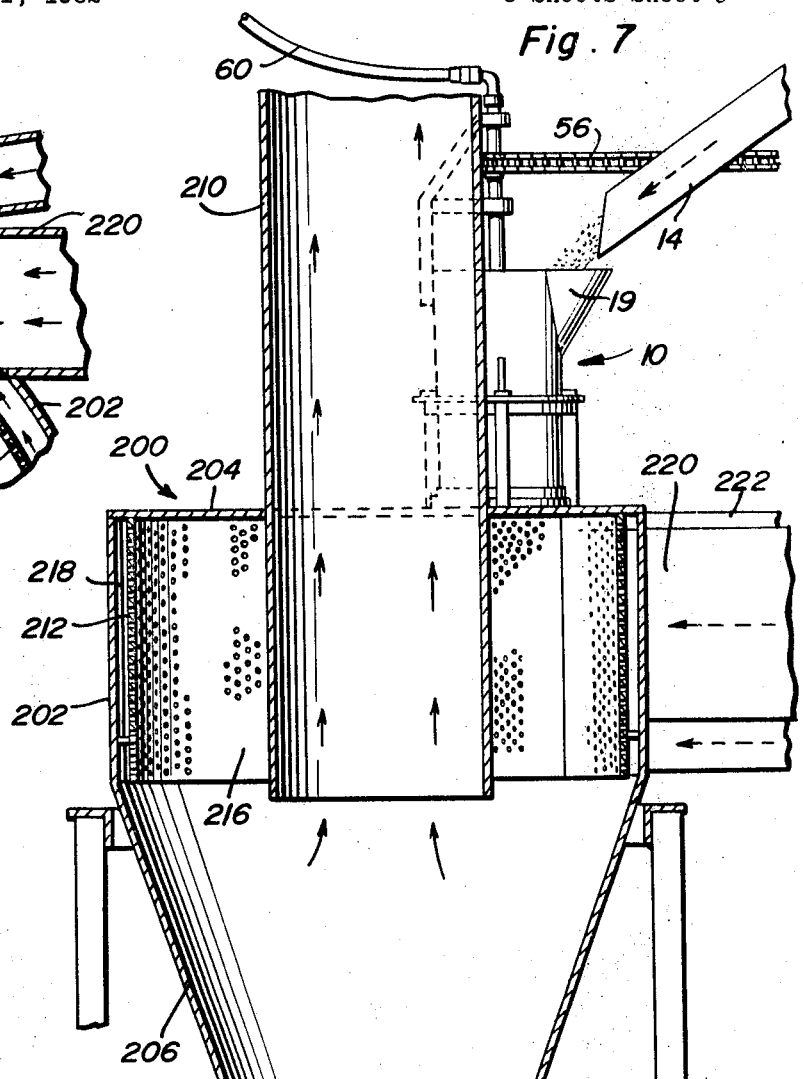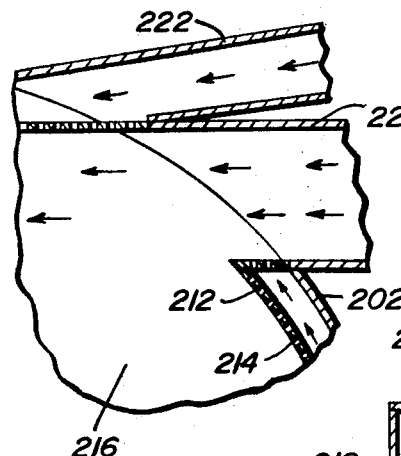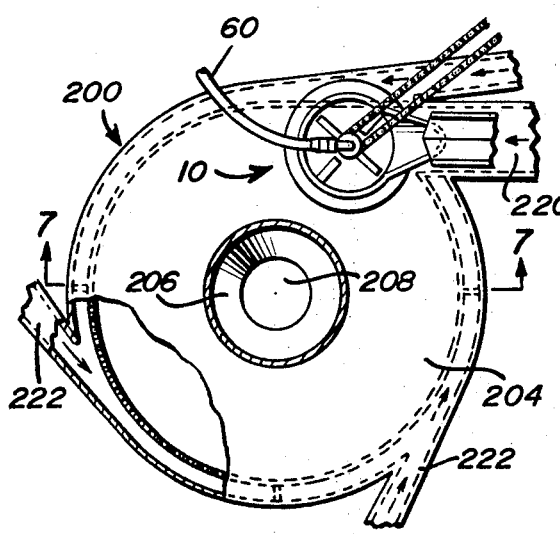
June 30, 1970 A. CARLSEN ET AL 3,517,716
METHOD FOR COMMINUTING AND DRYING COOKED FOOD PRODUCTS
Original Filed May 11, 1962 3 Sheets-Sheet 3
Albert Carlsen
Armstead J. Evans
INVENTORS

United States Patent Office 3,517,716
Patented June 30, 1970

3,517,716
METHOD FOR COMMINUTING AND DRYING COOKED FOOD PRODUCTS
Albert Carlsen, 4705 Hillcrest Drive, Boise, Idaho 83705, and Armstead J. Evans, Box 331, Blackfoot, Idaho 83221
Original application May 11, 1962, Ser. No. 194,081, now Patent No. 3,391,631, dated July 9, 1968. Divided and this application May 23, 1968, Ser. No. 731,493
Int. Cl. A23l *1/12;* A23n *15/00*
U.S. Cl. 146—230       4 Claims

ABSTRACT OF THE DISCLOSURE

Cooked potatoes are conditioned by comminution and aeration for free fall into a drier in which the comminuted particles are heated and further fluidized so as to undergo baffled, retarded gravitational flow. By such exposure to the drier chambers, moisture is completely removed from the cooked food particles in a continuous and rapid manner.

---

This application is a division of prior copending application Ser. No. 194,081, filed May 11, 1962 now Pat. No. 3,391,631.

This invention comprises a novel and useful method for drying mashed potatoes and more particularly pertains to a system which will greatly facilitate the operation of drying finely divided cooked foodstuffs such as potatoes and which will produce a greatly superior product thereby.

Primarily, the method of this invention is intended to facilitate the process of drying cooked foodstuffs in such a manner that a thorough and complete drying is effected in a minimum of time and with a minimum of handling of the foodstuff, without the contamination of food by the re-introduction into the process of previously dried or partially dried material whereby to obtain a dried food product having the optimum quality of compactness as to bulk with economy as to storage and transportation and which may be thereafter rapidly reconstituted to a high quality usable product in accordance with that of its original being or form.

Although for convenience in fully setting forth the application of the method of this invention to one form of practical use the following specification specifically pertains to the drying of mashed potatoes, it is to be understood that it is within the intent and the scope of this invention to likewise apply the method to the drying of other similar materials.

In the past, many methods and machines have been utilized for drying cooked or partially cooked foodstuffs and one of the most frequently used processes is to thoroughly dry a portion of the foodstuffs and then re-introduce or add back portions of the fully dried foodstuffs into the undried material in order to absorb sufficient moisture from the undried remainder of the material in order to obtain a mixture in a partially dried state and with a sufficiently low moisture content whereby it may be more readily and completely dried in an airstream or on a fluidized bed. The process of recycling or adding back fully dried materials or foodstuffs into the stream or batch of initially comminuted or mashed fresh foodstuff has in the past given rise to serious disadvantages such as the fracturing of the cellular structure of the foodstuffs due to excess handling, and in rendering the still undried material very susceptible to bacterial action and contamination. If the principle of recycling dried material into the undried material is used, any contamination of the product is quickly spread and multiplied by the continual recycling of the contaminated material.

It is therefore the primary object of this invention to provide a method which through the elimination of recycling will reduce to a minimum any possibility of spoilage or contamination of the material during the process of drying.

A further object of the invention is to provide a method which will enable a complete drying of the comminuted and mashed material during a single passage of the latter through the drier unit or units of the method, or to effect a partial drying of sufficient extent to enable the material to be efficiently subjected to additional drying or other treating operations.

Another object of the invention is to provide a method whereby a cooked material may be effectively mashed, comminuted and dispersed into extremely fine discrete particles by subjecting the cooked material to streams of air or other gases during the mashing and straining operation which comminutes and divides the cooked material, thereby obtaining a homogeneously aerated body of a comminuted and finely dvided cooked material which is very fluent in its nature, may be easily transported and handled, and has a minimum tendency to form relatively larger particles, and which thereby will enable the removal of moisture from the material at a maximum rate.

A further important object of the invention is to provide a method which will enable the obtaining of a thoroughly dried cooked food in a finely divided powdered or granular form by a single unidirectional passage of the food material through a comminuting and dispersing station or treating operation and a subsequent passage through a single drying chamber or station.

A further important object of the invention is to provide a method which will obtain in a single continuous operation the mashing of a cooked food product together with the intermixing of air or other gas therewith to thereby effect a very thorough comminuting and dispersing during the mashing operation of the material into finely divided particles having the maximum surface area subjected to a surrounding gaseous medium.

A further object of the invention is to provide a drying chamber in which comminuted food particles interspersed with an air or gaseous medium may be caused to pass in substantially free fall through the chamber while being subjected to the drying action of a transversely directed stream of heated air or gases to thereby dry to a predetermined extent the individual particles during their free fall to such an extent that the particles will no longer adhere to a surface on contact therewith.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a fragmentary detail view similar to FIG. 1 but showing a modified construction of the drier element of the invention and which utilizes a Teflon coating or liner for the wall of the drying chamber to prevent the encrustation of food particles thereon;

FIG. 4 is a view similar to FIG. 3 but showing a further modification in which there is employed a mechanical scraping or cleaning device for maintaining the wall of the chamber free of accumulations or encrustations of food particles thereon;

FIG. 5 is a detail view taken in section substantially upon a plane indicated by the section line 5—5 of FIG. 4;

FIG. 6 is a horizontal sectional view mostly in top plan, parts being broken away, of a modified construction shown in FIG. 7;

FIG. 7 is a view in vertical central section through a modified construction of drying chamber in which accumulation and encrustation of food particles upon the wall of the drying chamber is prevented by a moving boundary layer of air or gases introduced thereinto, being taken upon an enlarged scale substantially upon the plane indicated by the section line 7—7 of FIG. 6; and FIG. 8 is a fragmentary detail view in horizontal section through the drying chamber of FIG. 7 and showing the arrangement of the boundary air inlet conduit and the airstream introducing the comminuted and gaseously dispersed discrete food particles .

A preferred method in accordance with this invention is disclosed in FIGS. 1 and 2 and the invention will be set forth in detail in connection with these figures. The remaining FIGS. 3–8 of the drawings disclose various embodiments and slight variations in the manner of applying the basic principles of the invention as defined in connection with FIGS. 1 and 2.

EMBODIMENT OF FIGURES 1 AND 2

Figure 1:
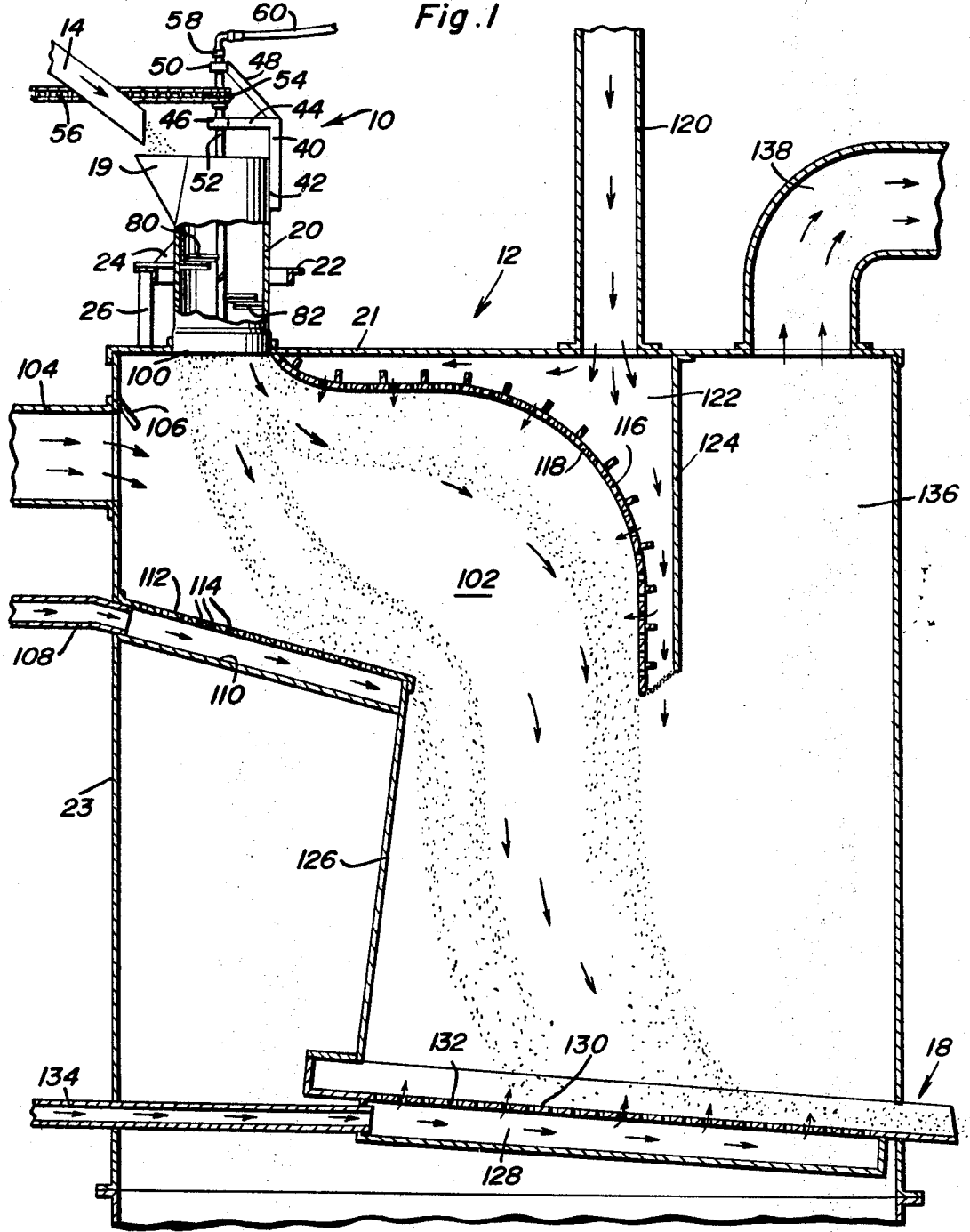
FIG. 1 is a somewhat diagrammatic view partly in elevation and partly in vertical central section, with parts broken away, or a suitable form of apparatus for carrying out the process and principles of this invention, arrows indicating the direction of flow through various portions of the apparatus.

The preferred form of apparatus for carrying out the basic principles of this invention is diagrammatically illustrated in FIG. 1, consisting of a food comminuting and dispersing unit indicated generally by the numeral 10 and which is disposed in close juxtaposition to a drier unit 12. In order to utilize the affects of gravity in effecting flow of material to be dried throughout the apparatus, the comminuting unit 10 is elevated above the drier unit 12 and as shown may directly rest upon the top of the latter. By means of any suitable means such as a chute or conveyor 14 cooked food products or other material to be dried by this invention are discharged into an inlet hopper 19 which is disposed at the upper end of and which communicates with the interior of the comminuting unit 10. The completely or partially dried food products are discharged from the unit 12 in a powder or in a semi-granular form to the exterior of the drying chamber by a discharge means indicated generally by the numeral 18 and which may comprise an inclined chute, a conveyor or any other suitable discharging mechanism.

Figure 2:
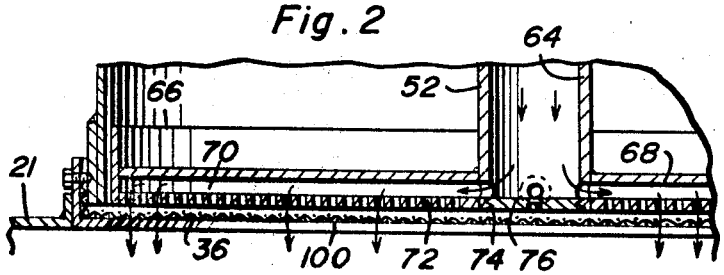
FIG. 2 is an enlarged detail view taken in vertical section through the lower portion of the comminuting and dispersing apparatus of FIG. 1.

Reference is now made next to FIGS. 1 and 2 for an understanding of the construction and operation of a preferred embodiment of the comminuting and dispersing unit 10.

The unit 10 includes an open topped hopper or inlet spout 19 which receives the material from the inlet means 14 and discharges it into the interior of the open topped preferably cylindrical body or casing 20, having an open lower or discharge end which directly communicates with the upper portion of the interior of the drier unit 12, as through the top wall 21 thereof as shown in FIG. 2.

The unit 10 is supported upon the top wall 21 of the drier unit 12 in any suitable manner. As shown in FIG. 1, an annulus 22 loosely surrounds the body 20 and braces the latter by means of diametrically extending brace members 24, the annulus itself being supported by the support rods 26 from the top wall 21.

The open lower end of the unit 10 has removably secured therein a comminuting means in the form of a screen, strainer or grating indicated generally by the numeral 36 in FIG. 2. Obviously, the size of the mesh or openings through this member will be selected in accordance with the particular cooked food which is to be comminuted and dispersed thereby. It is thus intended to provide removable and replaceable comminuting elements 36 as may be required in order to convert the apparatus from the comminuting of one material to another.

An L-shaped bracket or mounting member generally referred to by the reference numeral 40 is secured to the upper portion of the body 20 in any convenient manner as by welding 42 and includes an upper horizontal leg 44 which projects over the upper open end of the body, including a journal portion 46 on its free end which lies upon the vertical central axis of the cylindrical body 20. A second brace or support leg 48 is also provided and includes a journal portion 50 disposed in axial alignment with the journal 46, the lower end of this brace being secured to the support bracket 40. Journaled in the two members 50 and 46 and disposed axially within the body 20 is a hollow shaft 52, which between the bearing members 50 and 46 is provided with a drive sprocket 54 fixedly secured thereto and which by means of a sprocket chain 56 is rotated by any suitable power source, not shown, at any preferred speed.

The upper end of the shaft 52 has a rotary coupling assembly 58 secured thereto and carried thereby to which is connected one end of a conduit 60 and whose other end is supplied with fluid under pressure such as air or other suitable gaseous fluid from any suitable source (not shown).

The interior of the shaft 52 has a longitudinal bore 64 formed therethrough, see FIG. 2, and a plurality of blade elements 66 are carried by the lower end of the shaft 52 in a closely adjacent but slightly spaced relation with respect to the screening element 36. The blade elements extend generally radially outwardly of the shaft 52 and are inclined relative to the direction of their movement upon rotation of the shaft with their trailing edges 68 more closely adjacent the screen element 36. The trailing edge portions 68 are provided with a purality of longitudinal bores 70 therein which communicate with the central bore 64 of the shaft 52. In addition, each of the trailing edges includes a plurality of outward openings 72 which communicate with the corresponding bores 70 and open directly downwardly toward the screen element 36. The lower end portion of the shaft 52 is internally threaded as at 74 and has a closure plug 76 removably threadedly engaged therein.

If it is desired, the lower surfaces of the trailing edge portions 68 may be disposed in sliding contacting relation with the upper surface of the screen element 36, or they may be disposed at a slightly spaced distance from the upper surface as illustrated in FIG. 2 of the drawings.

With attention being now directed to FIG. 1 of the drawings, it will be seen that the shaft 52 additionally includes a plurality of blade elements 80 which each extends generally radially outwardly of the shaft and are inclined relative to the direction of their movement and having their trailing edge portions disposed lowermost. The body 20 of the unit is further provided with a plurality of stationary blades 82 which project generally radially inwardly from the cylindrical wall of the body and the blades 82 cooperate with the moving blades 80 to assist in blending and mixing the cooked or partially cooked potatoes or other foodstuff admitted into the upper end of the unit.

The operation of this unit and the process or method performed thereby is as follows. The cooked foodstuff or other material to be comminuted is supplied continuously or in batches if desired by the inlet means 14 into the spout 19 of the unit 10 and passes by gravity therethrough, to be discharged from the lower end of this unit into the drier 12. During this passage, gravity flow is assisted or even may be substantially replaced by the positive feeding and forcing of the material by the action of the inclined blades 66 and 80. As the potatoes or other foodstuffs or material are engaged by the blade elements 66, they are forced downwardly and are mashed through the screen element 36 beneath the trailing edges 68, to thus finely divide the mass of soft material which are mashed by the blades into separate particles as they emerge from the screen element. Compressed air or other gas is admitted through the conduit 60, coupling 58 and bore 64 of the shaft 52 is discharged by the longitudinal bores 70 and the orifices 72 directly into the mashed material beneath the blades 66 to thus aerate and convert this mass of material into an aerated or fluidized mass which is homogeneously interspersed with air or other gas prior to its passage through the screen.

This compressed air or other gas may be conditioned in various manners or for various purposes. Its primary function, however, is to aerate and lighten the mass of mashed material, to decrease the specific density thereof, and to thereby greatly facilitate the ultimate dispersing of this mass into small particles as the material is comminuted by its passage through the screen 36.

Still further, a very important function of this air or gas is that it will assist in keeping the screening media 36 free from blanking or obstruction by the mashed material, and by thus aerating and subdividing the mashed material will considerably reduce the detrimental affects of abrasion or other damage to the cellular structure of the material.

The importance of this injection of air or gas into the material prior to its passage through the comminuting screen cannot be over emphasized since it is essential in order that the mashed material may be sufficiently dispersed in a gaseous media to enable it to be readily moved, reduce the tendency of particles to adhere together into larger masses, and increase the surface area of the individual particles to thereby obtain the maximum rate of drying of these particles during their passage through the dried unit 12.

As a result of this combined operation of aerating the mass of material as it is propelled through the screening element, the mass is subdivided into fine particles or granules which are ideally adapted for rapid dehydration and drying. Further, it has been found that in the case of cooked potatoes, this method of comminution involves a minimum amount of cell damage to the food particles.

Reference is next directed more particularly to FIG. 1 for an understanding of the construction and the operation and the method performed by the drier unit 12 after the comminuted and dispersed particles of the mashed food material are discharged thereinto.

As shown in FIG. 1 the drier consists of a relatively large casing or housing of any suitable shape and size having side walls 23 in addition to the top wall 21 and a suitable bottom wall, not shown. The outlet opening of the comminuting unit 10 dischrges through an inlet opening 100 in top wall 21 which is preferably disposed adjacent one side of the housing. The drying operation is effected within a drying chamber indicated generally by the numeral 102 within the unit by means of the flow of a heated high volume of air or other drying gas which is passed through the chamber 102 transversely of the travel of the comminuted food material. Thus, entering the upper end of the chamber 102 is a heated air or gas inlet conduit 104 which may be provided with a suitable deflecting or directed baffle 106 inside the housing of the unit 12 and by means of which heated air or gas from any suitable source, not shown, at a desired temperature and rate of flow is introduced into the chamber 102 adjacent the top wall 12 in a direction which is transverse to the rate of flow of the comminuted and aerated particles of the food material to be processed. Although only one such inlet 104 has been illustrated it will be understood that a plurality of such inlets could be provided if desired at varying vertically and/or circumferentially spaced locations about the walls 23 of the unit 12.

A very important feature of this invention is that the comminuted food particles introduced through the inlet opening 100 pass by free fall downwardly through the drier unit. In order to retard this downward travel as well as to introduce additional heating media, a further conduit or series of conduits 108 is provided entering the drier unit housing wall 23 and communicating with a chest or header 110 having an inclined top surface 112 provided with a plurality of discharge orifices 114 which are generally upwardly directed. The gaseous medium from the conduit 108 thus opposes downward fall of the comminuted particles, retarding their fall, further assisting in dispersing and separating such particles and effecting a more rapid and complete contact of their surfaces by the incoming heating and drying gaseous medium. Again, as mentioned in connection with the conduit 104, the means 108 may consist of a plurality of conduits disposed in vertically or circumferentially spaced relation within the unit 12.

The transversely directed air or gas from the conduit 104 will of course have the effect of causing a lateral travel of the free falling stream of particles from the unit 10. In order to reduce the lateral extent which would thus be required for the unit 12 if no limitation were placed upon this lateral flow, there is provided a directive wall or baffle 116 which as shown in FIG. 1 may extend from adjacent the inlet opening 100 laterally and then downwardly to a convenient position within the housing. This wall is preferably provided with a plurality of perforations such as those indicated at 118 and may in fact constitute a screen. In order to prevent the accumulation and encrustation of the partially dried food particles which may be driven thereagainst by the heating air from the conduit 104, a boundary layer of air is maintained along the face of this deflector or baffle. For that purpose there is provided a further air inlet conduit 120 by which heated air or other gases from any suitable source are introduced through the top wall 21 into the housing of the unit and an air chest 122 which is defined between the rear face of the baffle 116 and a vertically extending wall 124. This boundary air passing through the orifice 118 will prevent to a large extent direct contact of the food particles against this baffle causing them to follow the contour of the baffle and continue their downward descent. This expedient thus reduces the overall horizontal or lateral extent of travel of the particles within the drier unit if no limiting means to the lateral travel of the free falling particles were provided.

A further limiting baffle wall 126 is indicated extending from the inward extremity of the air chest 110 towards the bottom of the heating chamber 102, and the previously mentioned discharge means 18 may have one end carried by this wall at the lower portion thereof. A further air chest 128 is provided below the chute 18 and delivers air upwardly through the bottom wall 130 of this chute by means of a plurality of orifices 132. The chest 128 in turn is provided with highly heated air or other gas by means of a supply conduit 134 from any suitable source. This air being upwardly directed likewise tends to retard the rate of fall of the comminuted particles in the chamber 102, so that the time of exposure of these free falling particles to the highly heated drying gaseous medium may be prolonged thereby reducing the required vertical extent of the heating chamber.

This baffle arrangement 116 together with the upwardly directed counterflow of the heating air from the chests 110 and 128 serve to bring the vertical and lateral dimensions of the drier unit 12 into a practical range suitable for commercial installations of this apparatus.

The heating and drying air together with the counterflow air and the boundary layer air thus introduced into the chamber 102 find their exit therefrom by rising upwardly through the chamber through an exhaust chamber 136 disposed to the right or rear of the partition 124 and from thence to an exhaust stack 138 to any suitable outlet. Thus there is provided a continuous flow through the drying chamber of the heated drying air, the boundary layer air and the counterflow air, which thereby obtains the maximum rapidity and completeness of the drying of the free falling comminuted and dispersed moist food particles.

MODIFICATION OF FIGURE 3

In the preceding embodiment disclosing the basic principles of this invention a boundary layer of flowing air under pressure was provided upon the face of the directive baffle 116 to prevent the encrustations and accumulations of moist particles thereon. It is possible, however, to employ other expedients to prevent such encrustation which is undesirable both from the standpoint of obstructing and decreasing the path and quantity of flow through the heating chamber and also as providing by the prolonged adherence of food particles thereon a source of possible contamination from bacterial growth and action. As shown in FIG. 3, the perforated deflective baffle 116 with its provision for a boundary airflow therealong is replaced by an imperforate baffle 150 which is disposed in substantially the same position as that of the baffle 116 of FIG. 1. However, in this form, the air chamber 122 is eliminated together with the air inlet conduit 120. Instead, the face of the baffle 150 against which the falling food particles might be driven by the heating air from the conduit 104 is coated with a lining or coating 152 of a character to which the particles will not adhere. Teflon has been found to be especially effective for this purpose and will effectively endure the temperature of the heated drying air and will prevent the adherence of food particles thereto. Other coatings or linings having this characteristic may be satisfactorily employed. This modification has the advantage that the necessity for the boundary layer conduit 120, the chamber 122 and the orifices 118 in the baffle 116 of the previous embodiment are completely eliminated thus producing a much simpler construction.

It will be appreciated that the coating 152 may be applied not only to the baffle 116, but to any other surfaces within the unit 12 with which the food particles may come in contact.

MODIFICATION OF FIGURE 4

A still further arrangement which may be provided to prevent the accumulation or encrustations of food particles upon a directive baffle construction indicated generally by the numeral 154 is shown in FIG. 4. In this arrangement, the surface of the baffle against which the good particles would normally strike is provided with an automatic cleaning means. Thus, a pair of endless belts 156 and 157, are entrained over suitable power, idler and guide pulleys or rollers 158, with power being applied from any suitable source, not shown, as by a belt drive 160 shown in FIG. 5. The belts are disposed in an overlapping arrangement such that by their positions they will define a moving wall or deflecting surface of any desired contour. Disposed on the rear side of the belts, and preferably at the rearward ends thereof are rods 162 to which are secured paddles or scraper blades 164. These blades are positioned to scrape and clean the rear surfaces of the rotating baffle 154. As indicated in FIG. 5, the driving means and the journaling pulleys or rollers for the belts are positioned outside of the drying chamber, and the rods 162 extend through suitable openings 166 provided in the end walls 168 of the drying chamber.

It will be appreciated that by providing a plurality of the overlapping endless belts 156, 157, any desired contour can be given to the moving deflecting surfaces. Further, the forming of objectionable encrustations upon the belts is prevented by the continuous wiping action of the blades 164.

It will be further appreciated that the previously set forth principle of employing a boundary layer of air may be obtained by forcing air through the belts by any suitable means, such as orifices in the belts or interstices in the material of the belts.

MODIFICATION OF FIGURES 6–8

As shown in FIGS. 6–8 a still further arrangement may be provided to prevent the accumulation of food particles upon the walls of the drying unit. In this modification of the drying apparatus the drier unit indicated generally by the numeral 200 consists of a cylindrical housing or casing 202 provided with a top wall 204 and having an open bottom to which is secured the upper end of a downwardly convergent conical funnel shaped member 206. The latter at its lower end is provided with a discharge opening 208 through which the completely dried material is discharged. Disposed centrally of the housing 202 is a vertically extending cylindrical air exhaust duct 210 whose lower end opens into the unit at the bottom of the drying chamber and just within the upper end of the discharge member 206 and its junction with the drying chamber housing 202. The previously described comminuting unit 10 is mounted upon the top wall 204 of the unit 200 in the same manner as described in connection with the preceding embodiment of FIGS. 1 and 2. The construction and operation of the comminuting unit 10 is identical with that as previously described.

The cylindrical housing 202 is provided with a concentrically disposed cylindrical perforated baffle 212 provided with a foraminous or reticulated surface area having the orifices or openings 214 therethrough. There is thus provided an annular heating chamber 216 which lies between the baffle 212 and the exhaust sleeve 210 and a further outer annular chamber 218 which lies between the cylindrical housing wall 202 and the cylindrical baffle 212. As shown more clearly in FIGS. 6 and 8, a heated drying air inlet duct 220 tangentially enters the cylindrical perforated wall 212 of the heating chamber 216, and thus produces a cyclonic circulation therein, this air emerging from ths open lower end of the chamber, passing downwardly into the conical member 206 and then upwardly through the air exhaust sleeve 210 to the atmosphere or any other suitable destination. A boundary layer inlet duct 222 also tangentially enters the wall 202 into the chamber 218 and passing through the orifices 214 therein enters the heating chamber 216 and prevents the accumulation of food particles against this chamber.

As suggested in FIG. 6, any desired number of the drying air ducts 220 and the boundary layer air duct 22 may be provided.

In the operation of this form of the invention the comminuted food particles in an aerated and dispersed form are discharged to the upper end of the heating chamber 216 and drop by free fall downwardly through the heating chamber eventually emerging in a dried condition through the discharge outlet 208 of the conical section 206. During their free fall, they are subjected to the heating and drying effect of the drying air from the duct 220 which heating effect is also supplemented to some extent by the heating and drying effect of the boundary layer air introduced into the heating chamber from the ducts 222. If desired, it is to be understood that upwardly directed streams of air as in the embodiment of FIGS. 1 and 2 may be provided either through the wall 212 of the heating chamber or from the conical section 206 to provide a counterflow of air which will retard the free falling descent of the food particles and thus prolong their exposure to the drying effects of the heated drying air.

Where reference is made in this specification to orifices, it is intended that this term shall generally designate all types of air pervious or air porous materials such as screens, fabrics, foraminous or vesicular materials.

It is believed that the operation of the apparatus as above set forth and the methods of comminuting, drying or both will now be readily apparent.

The foregoing is considered as illustrative only of the principles of the invention. Further, since numerous modifications and changes will readily occur to those skilled in

What is claimed as new is as follows:

1. A method of conditioning fluent material comprising the steps of: downwardly propelling said material through a comminuting zone; dividing the material while being discharged from said comminuting zone into discrete particles; and fluidizing the material while being discharged from the comminuting zone, said material being fluidized by introducing gas under pressure into the comminuting zone for discharge thereof as particles dispersed within the gas, said material being propelled through the comminuting zone with the assistance of gravity for free fall movement of the particles downwardly discharged from the comminuting zone.

2. The method of claim 1 wherein said fluent material is a mass of cooked potatoes.

3. The method of claim 2 wherein the material is discharged from the comminuting zone through a screen.

4. The method of claim 1 wherein the material is discharged from the comminuting zone through a screen.

References Cited

UNITED STATES PATENTS

| | | | |
|---|---|---|---|
| 1,420,558 | 6/1922 | Klein | 146—230 X |
| 2,082,419 | 6/1937 | Rietz | 241—51 X |
| 2,640,033 | 5/1953 | Marshall. | |

W. GRAYDON ABERCROMBIE, Primary Examiner

U.S. Cl. X.R.

99—207; 146—239